US006618436B2

(12) United States Patent
Greiss et al.

(10) Patent No.: US 6,618,436 B2
(45) Date of Patent: Sep. 9, 2003

(54) DIGITAL BASE-BAND RECEIVER

(75) Inventors: Israel Greiss, Raanana (IL); Eyran Lida, Meitar (IL)

(73) Assignee: Mysticom Ltd., Netanya (IL)

( * ) Notice: Subject to any disclaimer, the term of this patent is extended or adjusted under 35 U.S.C. 154(b) by 0 days.

(21) Appl. No.: 09/876,840

(22) Filed: Jun. 7, 2001

(65) Prior Publication Data

US 2002/0021767 A1 Feb. 21, 2002

Related U.S. Application Data

(63) Continuation of application No. 09/070,466, filed on Apr. 30, 1998, now Pat. No. 6,266,366.

(51) Int. Cl.[7] .............................................. H04L 25/06
(52) U.S. Cl. ..................................... 375/229; 375/317
(58) Field of Search ................................. 375/229, 233, 375/349, 350, 347, 286, 355, 316, 317, 318, 319, 346; 327/307, 308, 309, 310

(56) References Cited

U.S. PATENT DOCUMENTS

| | | | | |
|---|---|---|---|---|
| 5,408,262 A | * | 4/1995 | Kim et al. ..................... 348/21 |
| 5,425,059 A | | 6/1995 | Tsujimoto ................... 375/347 |
| 5,448,206 A | | 9/1995 | Newhall ..................... 332/103 |
| 5,483,557 A | * | 1/1996 | Webb .......................... 375/349 |
| 5,852,524 A | | 12/1998 | Glover et al. ................. 360/51 |
| 5,872,666 A | | 2/1999 | Saiki et al. .................... 360/46 |
| 6,148,025 A | | 11/2000 | Shirani et al. ............... 375/238 |
| 6,188,721 B1 | | 2/2001 | Shirani et al. ............... 375/232 |
| 6,280,391 B1 | * | 8/2001 | Olson et al. ................. 600/509 |

OTHER PUBLICATIONS

Mueller and Mueller, "Timing Recovery In Digital Synchronous Data Receivers", IEEE Transactions on Communications, vol. 24, May 1976, pp. 516–531. No. 5.

Ferther and Solve, "Symbol–Rate Timing Recovery Comprising The Optimum Signal–To–Noise Ratio In A Digital Subscriber Loop", IEEE Transactions on Communications, Vol. 45, Aug. 1997, pp. 925–936. No. 8.

* cited by examiner

*Primary Examiner*—Chi Pham
*Assistant Examiner*—Kevin M. Burd
(74) *Attorney, Agent, or Firm*—Ladas & Parry

(57) ABSTRACT

A receiver of baseband signals from a communications line characterized by baseline wander, including a pre-decoding section, which receives and samples the signals and subtracts each sample from a preceding sample so as to generate corrected data, and an equalization section, which receives the corrected data and generates equalized output data representative of data input to the line and generally free of the baseline wander. The receiver preferably includes an A/D converter, which digitizes the signals either before or after pre-decoding.

44 Claims, 11 Drawing Sheets

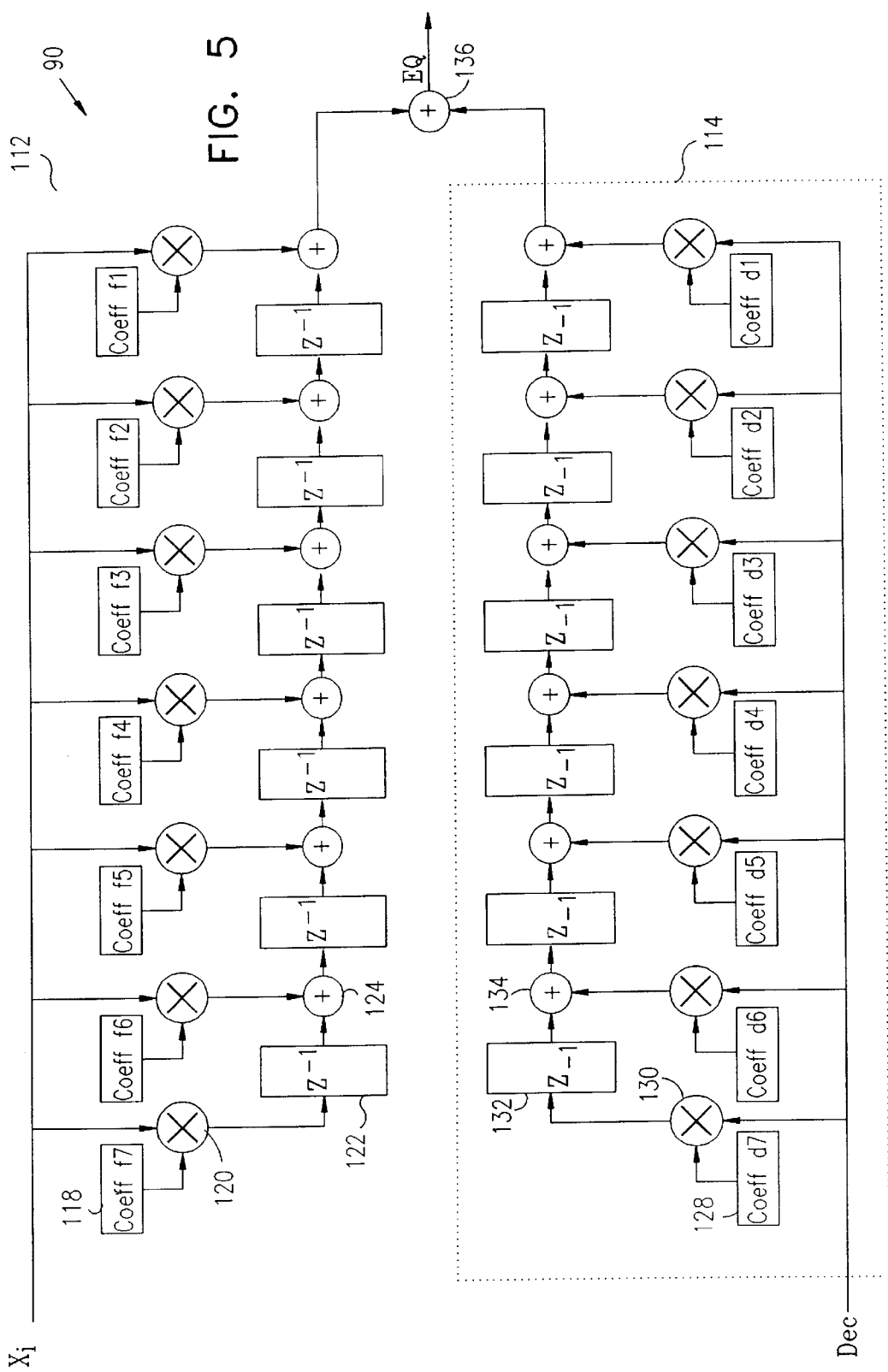

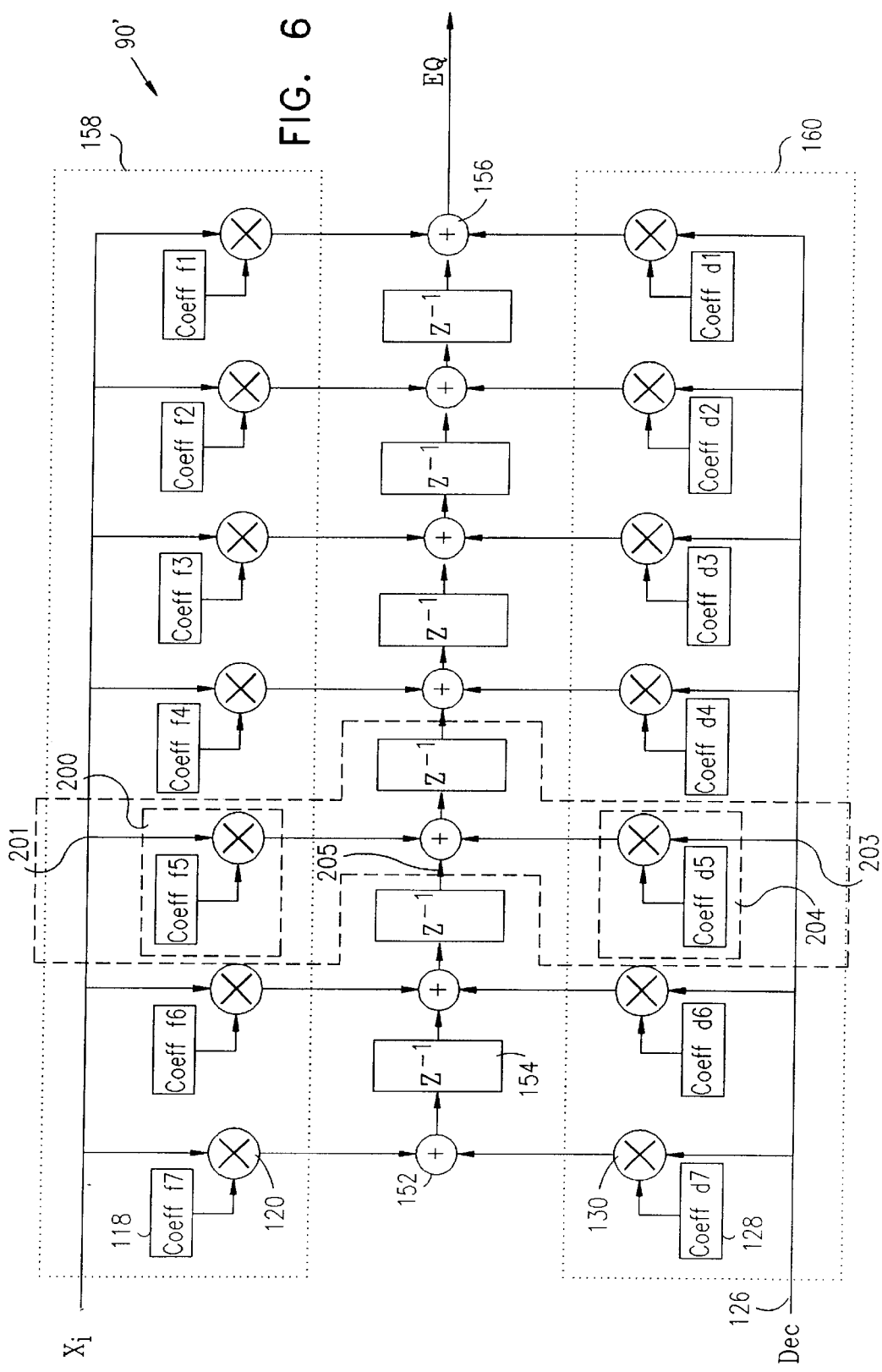

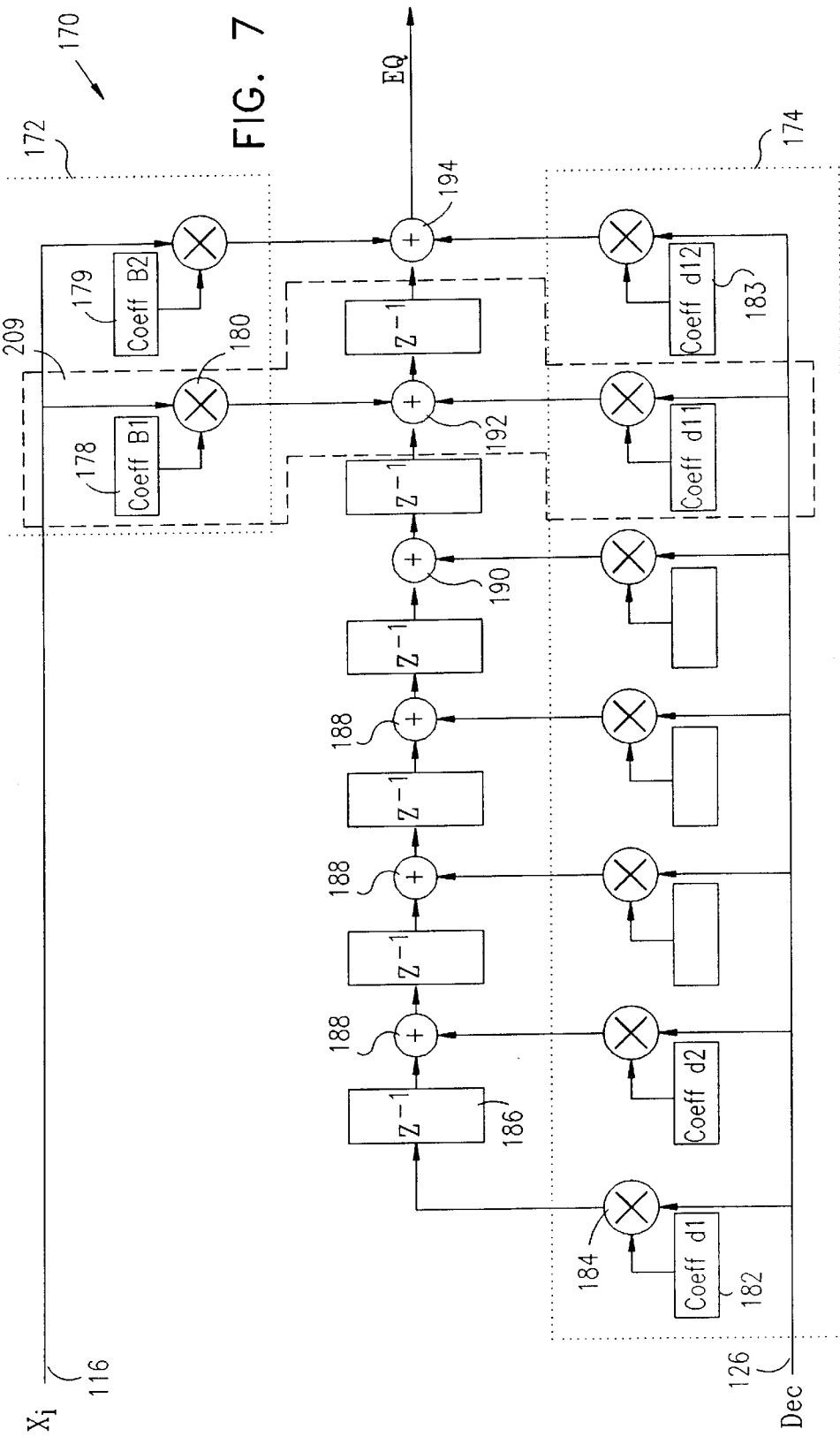

DIGITAL BASE-BAND RECEIVER

CROSS-REFERENCE TO RELATED APPLICATIONS

This application is a continuation of U.S. patent application Ser. No. 09/070,466, filed Apr. 30, 1998 now U.S. Pat. No. 6,266,366.

FIELD OF THE INVENTION

The present invention relates generally to digital signal processing, and specifically to digital receivers for AC-coupled lines.

BACKGROUND OF THE INVENTION

Local-area networks (LANs) or communication devices transmitting and receiving digital signals commonly operate on standards such as Ethernet 10BASE-T or 100BASE-TX. The 100BASE-TX Ethernet standard enables communication at 100 Mb/s on unshielded twisted pair (UTP) copper wire by using MLT-3 encoding. MLT-3 encoding transmits "1"s as ordered level changes between 3 levels {1, 0, −1}, whereas "0"s are transmitted as the same level as the previous symbol. Thus the signal 1111111 could be encoded as {0, 1, 0, −1, 0, 1, 0, −1}, and the signal 1111011100 could be encoded as {0, 1, 0, −1, −1, 0, 1, 0, 0, 0}. In principle, other forms of ordered level change encoding can also be used. For example, instead of 3 ordered level changes, signals could also be encoded with 5 ordered level changes {2, 1, 0, −1, −2}.

One of the advantages of ordered level change encoding is that the high frequency components of the signal are reduced. For MLT-3 encoding with signals clocked at a standard rate of 125 MHz (8 ns per symbol), the signal frequency varies from 0, for a run of "0"s, to a maximum of 31.25 MHz (125/4) for a run of "1"s. (125 MHz is a nominal frequency, and in practice the frequency will vary slightly from the nominal.) The relatively low signal frequency is advantageous in reducing electromagnetic interference (EMI) and relaxing frequency-related demands on signal processing equipment and wiring. However, MLT-3 encoding creates inherent problems for receivers, particularly when the receivers are at the end of long runs (of the order of 100 m) of cable, as described hereinbelow.

MLT-3 signals are transmitted and received via transformers, so that there is no path for DC between transmitter and receiver. If a continuous string of "0"s is transmitted, then there may be an effective DC level in the transmitted signal, which needs to be detected by the receiver. At the receiver, the signal is detected by digitizing and comparing the received signal to the receiver's baseline. In order to correctly detect DC levels, the receiver's baseline must be constantly adjusted for baseline wander (BLW)—since BLW or the inaccurate correction thereof causes errors in the recovered signal.

The incoming signal is sampled and digitized by an A/D converter, preferably operating at the minimum theoretical sample rate for the A/D converter, equal to the clock rate of the signal, i.e., the nominal 125 MHz. In order for the A/D converter to operate efficiently, the receiver has to recover the exact clock timing, both in frequency and in phase, from the received signal.

In a paper by Mueller and Muller, "Timing recovery in digital synchronous data receivers," IEEE Transactions on Communications, pp 516–531, Vol. 24, May 1976, which is herein incorporated by reference, the authors propose a timing recovery algorithm. The paper is accepted in the art as the basis for timing recovery algorithms, and relies on selecting a timing function that is zero at an assumed best sampling point. The phase of the sampling point is then adjusted until its phase is zero.

In a paper by Fertner and Solve, "Symbol-rate timing recovery comprising the optimum signal-to-noise ratio in a digital subscriber loop," IEEE Transactions on Communications, pp 925–936, Vol. 45, August 1997, which is herein incorporated by reference, the authors investigate a recovery algorithm that is based on the correlation between a mean-square error from a decision feedback equalizer and an arriving sample signal. The authors also point out practical complications involved in the relatively conceptually straightforward derivation of Mueller and Muller.

FIG. 1 is a graph showing the typical received shape of an 8 ns positive pulse after transmission along different lengths of unshielded twisted pair category 5 (UTP cat-5) cables. The pulse, comprising a sharp leading edge and a less sharp trailing edge, drops in height exponentially, and increases in width with increasing cable length. Consequently, for cable lengths over 100 m, it becomes increasingly difficult to recover the clock and distinguish one pulse from the next.

FIG. 2 shows a composite received signal 11 for a cable 130 m long, given an input signal 13 of 1, 1, 1, 1, 0, −1, 0, 1, wherein 1 corresponds to a positive pulse and −1 corresponds to a negative pulse. The circles on composite graph 11 correspond to measured signals spaced 8 ns apart. This graph illustrates the difficulty of recovering the clock and the input signal values, since the measured values are not simply related to the input signal of 1, 1, 1, 1, 0, −1, 0, 1.

FIG. 3 is a block diagram of a receiver 20 used to detect 100BASE-TX signals of the type shown in FIG. 2, as is at present known in the art. Signals from a magnetics (transformer) stage are input to an automatic gain control (AGC) amplifier 14, and transferred to an analog summer 18, wherein a BLW correction is added. The result is transferred to an A/D converter 21. The A/D converter generates corresponding digital signals, sampled according to an input clock signal from a PLL 40 and phase multiplexer 42, and the digitized signals are transferred to a digital signal processing (DSP) core 48. The clock signal is synchronized in frequency and phase with the incoming input signal, in order to minimize conversion errors in the A/D converter.

DSP core 48 comprises a forward equalization (FEQ) module 26, an adder 28, a decision (DEC) module 30, and a decision feedback equalizer (DFE) module 32, which together act to supply data to a baseline wander correction module 24. BLW correction module 24 supplies the aforementioned (analog) BLW correction signal to summer 18. Typically, the magnetics stage has a non-linear inductance, and acts as a high pass filter, and BLW module 24 comprises a matching low pass filter whose frequency response is adjustable. The characteristics of the low pass filter are pre-adjusted to minimize BLW. The high pass filter characteristics of the magnetics stage, however, depend on the DC current flowing in the magnetics stage, so that the characteristics are not fixed and are difficult to predict.

DSP core 48 also comprises a DSP control 36 and a timing control 38. On the basis of signals output by decision module 30, DSP control 36 supplies data to timing control 38. Timing control 38 controls the frequency and phase of the clock signal supplied by multiplexer 42, for example, according to the aforementioned method of Mueller and Muller. Core 48 transfers the equalized, BLW-corrected signals in MLT-3 format to module 46, wherein the signals are processed further for transmission in binary format, preferably in a non-return-to-zero (NRZ) format.

Other existing receivers use analog equalizers, such as high pass filters; these equalizers inherently enhance the noise at the same time as they enhance the high-frequency gain. Errors in the assumed parameter values of the equalizers lead to an error in reconstructing the BLW. Furthermore, any decision error leads to symbol error and inaccurate BLW correction for a relatively long time period.

In order to overcome the inherent limitations of poor transmission of low frequency signals through the input transformers, existing receivers use complicated adaptive algorithms to reconstruct the transmitted DC level. Existing receivers continuously monitor the signal baseline to correct BLW.

SUMMARY OF THE INVENTION

It is an object of the present invention to provide an improved receiver for high frequency digital signals.

It is a further object of some aspects of the present invention to provide methods and devices for substantially eliminating the effects of baseline wander in a receiver.

It is a further object of some aspects of the present invention to provide improved methods and devices for synchronizing a receiver clock with an input signal clock rate.

It is a yet further object of some aspects of the present invention to provide improved methods and devices for equalizing received signals.

In preferred embodiments of the present invention, a receiver comprises an A/D converter with a variable reference, a pre-decoding section, a digital equalization section, and an output section. The A/D converter preferably accepts 100BASE-T signals, and the output section preferably outputs the signals in NRZ format. Signals input to the receiver are transferred directly to the A/D converter, with substantially no intervening signal adjustment for baseline wander, unlike receivers at present known in the art. The necessity for additional compensation for baseline wander is substantially eliminated by the pre-decoding section, wherein each signal sampled and digitized by the A/D converter is subtracted from a preceding sample, thus substantially eliminating the effects of baseline wander (BLW).

In preferred embodiments of the present invention, the A/D converter is placed before the pre-decoding section. Alternatively, the pre-decoding section is placed-before the A/D converter.

In some preferred embodiments of the present invention, the equalization section has a unique pipeline architecture, enabling it to operate at substantially faster clock rates, and with substantially fewer components, compared to equalizers known in the art. The equalization section comprises both forward equalization and decision feedback equalization stages on a common pipeline, with multiplicative coefficients determined using an adaptive process, preferably a least mean squares adaptation. Preferably, clock recovery from the incoming signal is performed by measuring differences between two or more of the coefficients evaluated in the equalization section, using the differences to give substantially better clock recovery for weaker signals than methods at present known in the art. Most preferably, differences are measured between one coefficient in the decision feedback equalization stage, and one coefficient in the forward equalization stage.

There is therefore provided, in accordance with a preferred embodiment of the present invention, a receiver of baseband signals from a communications line characterized by baseline wander, including:

a pre-decoding section, which receives and samples the signals and subtracts each sample from a preceding sample so as to generate corrected data; and an equalization section, which receives the corrected data and generates equalized output data representative of data input to the line and generally free of the baseline wander.

Preferably, the receiver includes an A/D converter which digitizes the signals and transmits the digitized signals to the pre-decoding section. Alternatively, the A/D converter digitizes the corrected data and transmits the digitized corrected data to the equalization section.

Preferably, the equalization section includes a pipeline, including one or more delay stages and one or more respective adders, and the pre-decoding section includes an input to the pipeline.

Preferably, the baseband signals are encoded in an ordered level change format, most preferably an MLT-3 format.

Preferably, the equalization section includes a decision module which compares the equalized data to one or more predetermined thresholds and responsive thereto outputs decision data corresponding to a level of the input data. In a preferred embodiment, the decision module outputs an error signal, indicative of a deviation of the equalized output data relative to the level of the input data, which error signal is fed back to an input of the equalization section. Preferably, the equalization section generates, responsive to the error signal, one or more forward equalization coefficients, which multiply the corrected data, and one or more decision feedback equalization coefficients, which multiply the decision data, and the multiplied corrected data and decision data are summed to generate the equalized data. Further preferably, the receiver includes a clock generator, which provides a timing signal to control the sampling of the A/D converter, wherein the generator adjusts the timing signal responsive to one or more of the coefficients.

There is also provided, in accordance with a preferred embodiment of the present invention, a receiver of baseband signals from a communications line, including:

an A/D converter, which samples and digitizes the signals to generate digitized data;

an equalization section, which receives the digitized data and generates equalized output data representative of data input to the line;

a-decision module, which compares the equalized data to one or more predetermined thresholds and responsive thereto outputs decision data indicative of a level of the data input to the line; and a clock generator which generates a variable clock signal responsive to the decision data, which clock signal is used to time the sampling of the A/D converter.

Preferably, a phase of the clock generator is varied responsive to the decision data. Most preferably, the clock generator provides a plurality of clock signals having different, respective phases, such that the phase of the clock generator is varied by selecting one of the plurality of signals responsive to the decision data.

Additionally or alternatively, a frequency of the clock generator is varied responsive to the decision data.

Preferably, the clock signal is generated responsive to an error signal indicative of a deviation of the equalized output data relative to the data input to the line.

In a preferred embodiment, the equalization section includes a processing pipeline, which generates, responsive to the error signal, one or more equalization coefficients, including one or more forward equalization coefficients which multiply the digitized data, and one or more decision feedback equalization coefficients, which multiply the decision data, and the clock signal is generated responsive to one or more of the coefficients. Most preferably, the clock generator generates the clock signal responsive to a precursor coefficient of the one or more forward equalization coefficients and a most significant one of the one or more decision feedback equalization coefficients.

Further preferably, the clock generator generates the clock signal responsive to an integration of the at least one of the coefficients over a predetermined number of clock cycles, wherein the clock signal is varied responsive to a primary difference between the integration and the at least one of the coefficients. Alternatively or additionally, the clock signal is varied responsive to a secondary difference corresponding to a variation over time in the primary difference.

In a preferred embodiment, the clock generator generates the clock signal responsive to a difference between one of the forward equalization coefficients and one of the decision feedback equalization coefficients. Preferably, the clock generator generates a frequency offset of the clock signal responsive to an integration over a predetermined number of clock cycles of the difference between one of the forward equalization coefficients and one of the decision feedback equalization coefficients. Alternatively or additionally, the clock generator generates a phase change of the clock signal responsive to at least one integration of the difference between one of the forward equalization coefficients and one of the decision feedback equalization coefficients.

There is further provided, in accordance with a preferred embodiment of the present invention, a receiver of baseband signals from a communications line, including:
  an A/D converter, which samples and digitizes the signals to generate digitized data;
  an equalization section, including a pipeline which receives the digitized data and generates equalized output data representative of data input to the line, the pipeline including a plurality of multipliers, which multiply data input thereto by respective multiplication coefficients, and a plurality of adders, which receive and sum the multiplied data; and
  a decision module, which compares the equalized output data to one or more predetermined thresholds so as to generate decision data indicative of a level of the input data, which decision data are input to the pipeline together with the digitized data.

Preferably, the pipeline includes a plurality of delay registers, intermediate the adders, which transfer the data from one of the adders to the next in the pipeline.

In a preferred embodiment, the decision module generates an error signal responsive to a deviation of the equalized data relative to the decision data, and the multipliers multiply the digitized data and the decision data by respective coefficients generated by the equalization section responsive to the error signal. Preferably, one or more of the coefficients are generated by multiplying the error signal by the digitized data or, alternatively or additionally, by multiplying the error signal by the decision data.

Preferably, each of at least some of the adders in the pipeline receives and sums a respective one of the multiplied digitized data and a corresponding one of the multiplied decision data, wherein at least one of the at least some of the adders receives and sums the respective multiplied digitized data and multiplied decision data together with an output of a preceding one of the adders in the pipeline.

In a preferred embodiment, the pipeline includes a pre-decoding section, which subtracts each of the input data from a preceding one of the data so as to substantially eliminate baseline wander from the signals.

There is additionally provided, in accordance with a preferred embodiment of the present invention, a method for processing baseband signals from a communications line characterized by baseline wander, including:
  receiving and sampling the signals and subtracting each sample from a preceding sample, in a pre-decoding section, so as to generate corrected data; and
  receiving the corrected data, in an equalization section, and generating equalized output data therefrom representative of data input to the line and generally free of the baseline wander.

Preferably, the method includes digitizing the signals in an A/D converter and transmitting the digitized signals to the pre-decoding section or, alternatively, digitizing the corrected data in an A/D converter and transmitting the digitized corrected data to the equalization section.

Preferably, generating equalized output data includes passing the data through a pipeline, including one or more delay stages and one or more respective adders, and subtracting each sample includes inverting each sample and inputting the inverted sample to the pipeline.

Preferably, receiving the signals includes receiving signals encoded in an ordered level change format, most preferably an MLT-3 format.

Preferably, the method includes comparing the equalized data to one or more predetermined thresholds and responsive thereto outputting decision data corresponding to a level of the input data, wherein comparing the data preferably includes outputting an error signal, indicative of a deviation of the equalized output data relative to the level of the input data, and wherein equalizing the data includes processing the data responsive to the error signal.

In a preferred embodiment, equalizing the data includes generating, responsive to the error signal, one or more forward equalization coefficients, which multiply the corrected data, and one or more decision feedback equalization coefficients, which multiply the decision data, and summing the multiplied corrected data and decision data. Preferably, the method further includes generating a clock signal to time the sampling of the signals, wherein the clock signal is adjusted responsive to one or more of the coefficients.

There is moreover provided, in accordance with a preferred embodiment of the present invention, a method of processing baseband signals received from a communications line, including:
  sampling and digitizing the signals to generate digitized data;
  determining one or more equalization coefficients responsive to a level of the digitized data;
  equalizing the digitized data to generate equalized output data representative of data input to the line by multiplying the digitized data by the one or more equalization coefficients; and
  generating a variable clock signal responsive to at least one of the one or more equalization coefficients, which clock signal is used to time the sampling.

Preferably, generating the clock signal includes varying a phase of the clock signal responsive to the decision data, most preferably by providing a plurality of clock signals having different, respective phases, and selecting one of the plurality of signals responsive to the decision data.

Alternatively or additionally, generating the clock signal includes varying a frequency of the clock signal responsive to the decision data.

In a preferred embodiment, determining the one or more coefficients includes generating an error signal indicative of a deviation of the equalized output data relative to the data input to the line and determining one or more of the coefficients responsive to the error signal. Preferably, determining the one or more equalization coefficients includes determining one or more forward equalization coefficients and one or more decision feedback equalization coefficients, and equalizing the data includes multiplying the digitized data by the one or more forward equalization coefficients and multiplying the decision data by the one or more decision feedback equalization coefficients and adding the multiplied data together in a pipeline, and generating the clock signal is performed responsive to one or more of the coefficients. Most preferably, generating the clock signal includes generating a signal responsive to a precursor coefficient of the one or more forward equalization coefficients and a most significant one of the one or more decision feedback equalization coefficients.

In a preferred embodiment, generating the clock signal includes integrating at least one of the coefficients over a predetermined number of clock cycles to generate an integrated output and varying the clock signal responsive to the integrated output. Preferably, varying the clock signal includes determining a primary difference between the integrated output and the at least one of the coefficients and varying the clock signal responsive to the primary difference. Additionally or alternatively, varying the clock signal includes determining a secondary difference corresponding to a variation over time in the primary difference and varying the clock signal responsive to the secondary difference.

In a preferred embodiment, generating the clock signal includes varying the clock signal responsive to a difference between one of the forward equalization coefficients and one of the decision feedback equalization coefficients. Preferably, varying the clock signal includes generating a frequency offset of the clock signal responsive to an integration over a predetermined number of clock cycles of the difference between the one of the forward equalization coefficients and the one of the decision feedback equalization coefficients. Alternatively or additionally, varying the clock signal includes generating a phase change of the clock signal responsive to at least one integration of the difference between the one of the forward equalization coefficients and the one of the decision feedback equalization coefficients.

There is further provided, in accordance with a preferred embodiment of the present invention, a method of processing baseband signals received from a communications line, including:

sampling and digitizing the signals to generate digitized data;

equalizing the digitized data by processing the data in a pipeline to generate equalized output data representative of data input to the communications line, which processing includes:

multiplying data input to the pipeline by a plurality of respective multiplication coefficients; and summing the multiplied data together in the pipeline;

comparing the equalized output data to one or more predetermined thresholds so as to generate decision data indicative of a level of the input data; and inputting the decision data to the pipeline together with the digitized data.

Preferably, multiplying and summing the data include multiplying and summing data in a plurality of pipeline stages, and equalizing the data includes delaying the data in the pipeline between one stage and the next.

In a preferred embodiment, comparing the equalized data comprises generating an error signal responsive to a deviation of the equalized data relative to the decision data, and multiplying the digitized data and the decision data includes multiplying the data by coefficients generated responsive to the error signal. Preferably, multiplying the data includes multiplying the data by coefficients generated by multiplying the error signal by the digitized data. Additionally or alternatively, multiplying the data includes multiplying the data by coefficients generated by multiplying the error signal by the decision data.

Preferably, summing the data includes summing a respective one of the multiplied digitized data and a corresponding one of the multiplied decision data at one or more stages in the pipeline. Preferably, summing the data at the one or more stages includes summing the multiplied digitized data and the multiplied decision data together with an output of a preceding stage in the pipeline.

In a preferred embodiment, the method includes substantially eliminating baseline wander from the signals by subtracting each of the data input to the pipeline from a preceding one of the data input to the pipeline.

The present invention will be more fully understood from the following detailed description of the preferred embodiments thereof, taken together with the drawings in which:

BRIEF DESCRIPTION OF THE DRAWINGS

FIG. 5 is a block diagram of a forward equalizer and a decision feedback equalizer, for use in the receiver of FIG. 4A or the receiver of FIG. 4B, in accordance with a preferred embodiment of the present invention;

FIG. 6 is a block diagram of a combined forward equalizer and decision feedback equalizer, for use in the receiver of FIG. 4A or the receiver of FIG. 4B, in accordance with a preferred embodiment of the present invention;

FIG. 7 is a block diagram of an alternative combined forward equalizer and decision feedback equalizer, for use in the receiver of FIG. 4A or the receiver of FIG. 4B, in accordance with a preferred embodiment of the present invention;

DETAILED DESCRIPTION OF PREFERRED EMBODIMENTS

Figure 4A:
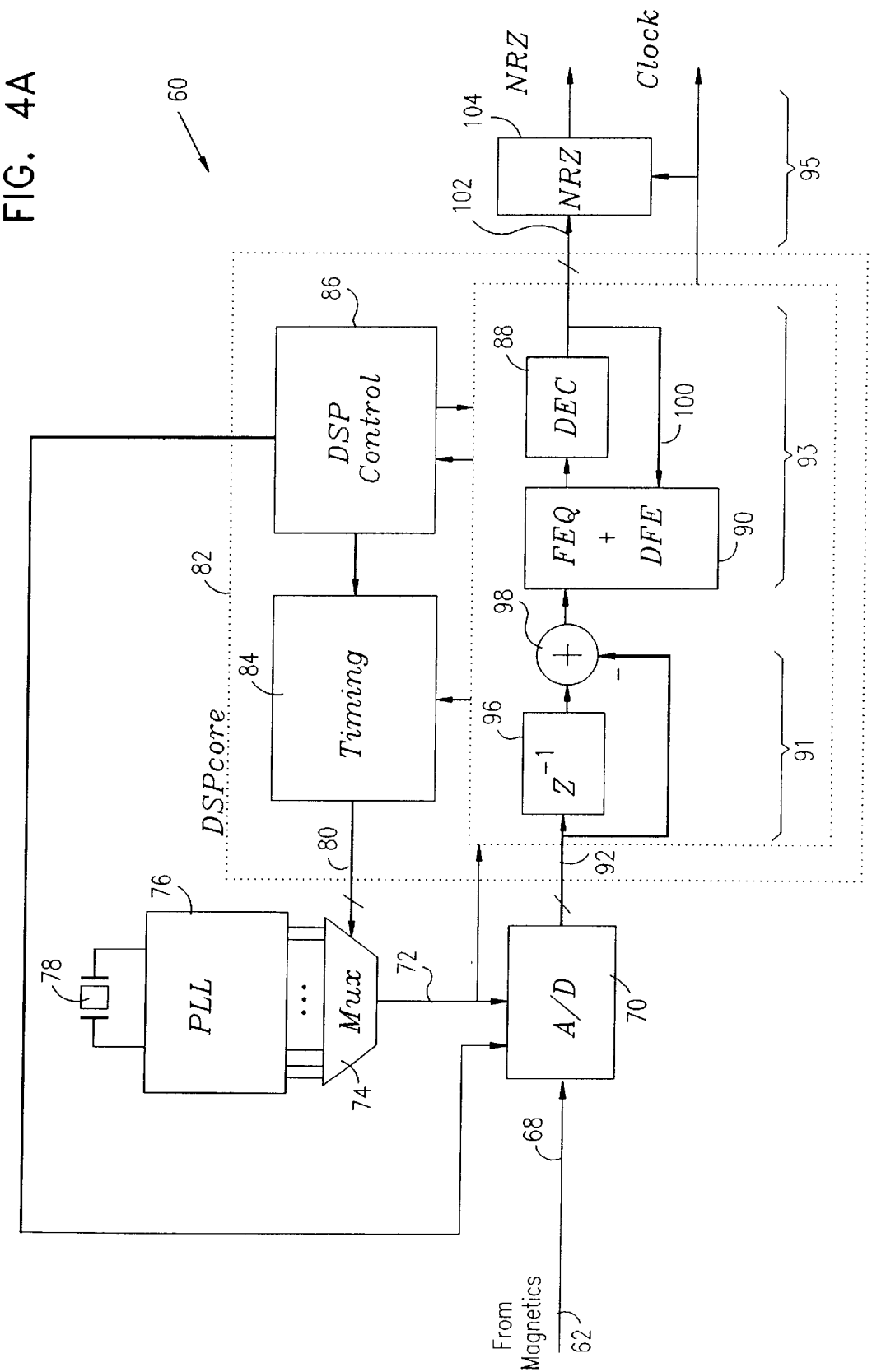
FIG. 4A is a block diagram of a receiver for MLT-3 signals in accordance with a preferred embodiment of the present invention.

Reference is now made to FIG. 4A, which is a block diagram of a receiver 60, in accordance with a preferred embodiment of the present invention. Receiver 60 receives 100BASE-T signals in MLT-3 format from a magnetics stage (not shown) on an input line 62 to an A/D converter 70, without intervening input for baseline wander (BLW) correction, wherein the analog signal is converted to digital signals output on a plurality of lines 92. A/D converter 70 preferably has an 8-level selectable dynamic range, which is selected according to signals from a digital signal processing (DSP) controller module 86. Preferably the dynamic range of A/D converter 70 is changed by adjusting a reference voltage of the converter. Receiver 60 is preferably implemented in a single custom integrated circuit chip, although discrete components or a combination of discrete and custom or semi-custom components may similarly be used.

Preferably A/D converter 70 comprises a six-bit converter and samples the incoming signals according to a clock signal derived from a phase-locked-loop clock 76. Clock 76 supplies a plurality of clock signals to a multiplexer 74, preferably at least sixteen different clock signals at a frequency of about 125 MHz, each signal having a respective, different phase. Multiplexer 74 outputs one of the clock signals, chosen according to data supplied to multiplexer 74 from a timing controller 84, to A/D converter 70. The generation of controlling signals to timing controller 84 is described in more detail hereinbelow.

Figure 1:
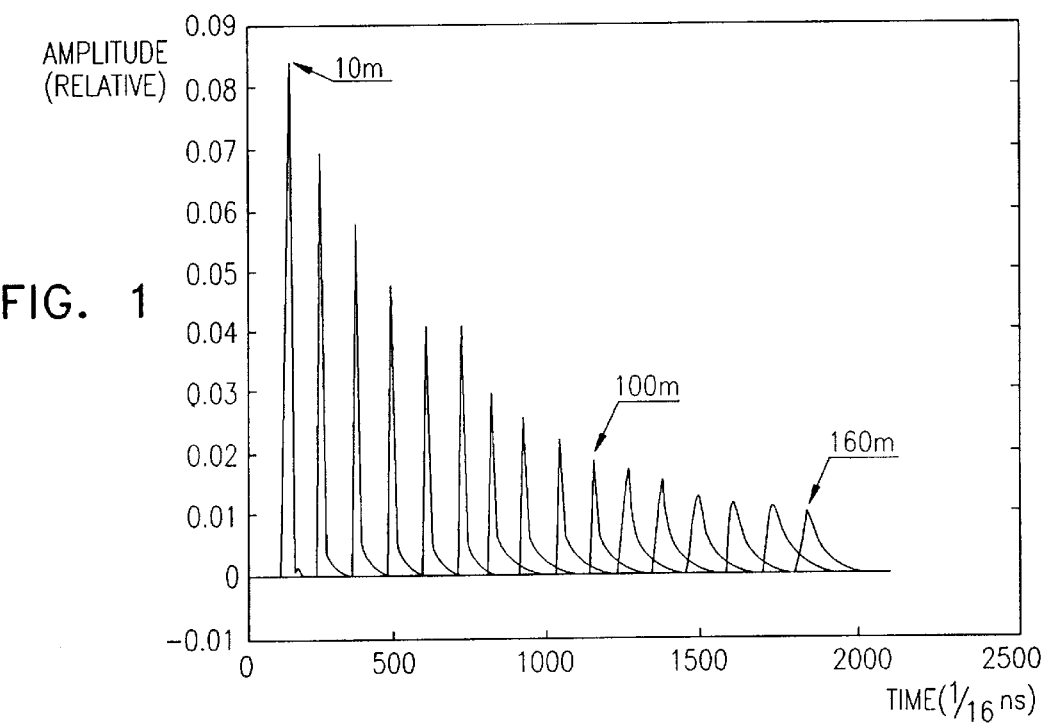
FIG. 1 is a graphical representation of the impulse response of a line to pulses conveyed over cables of different lengths.
Figure 2:
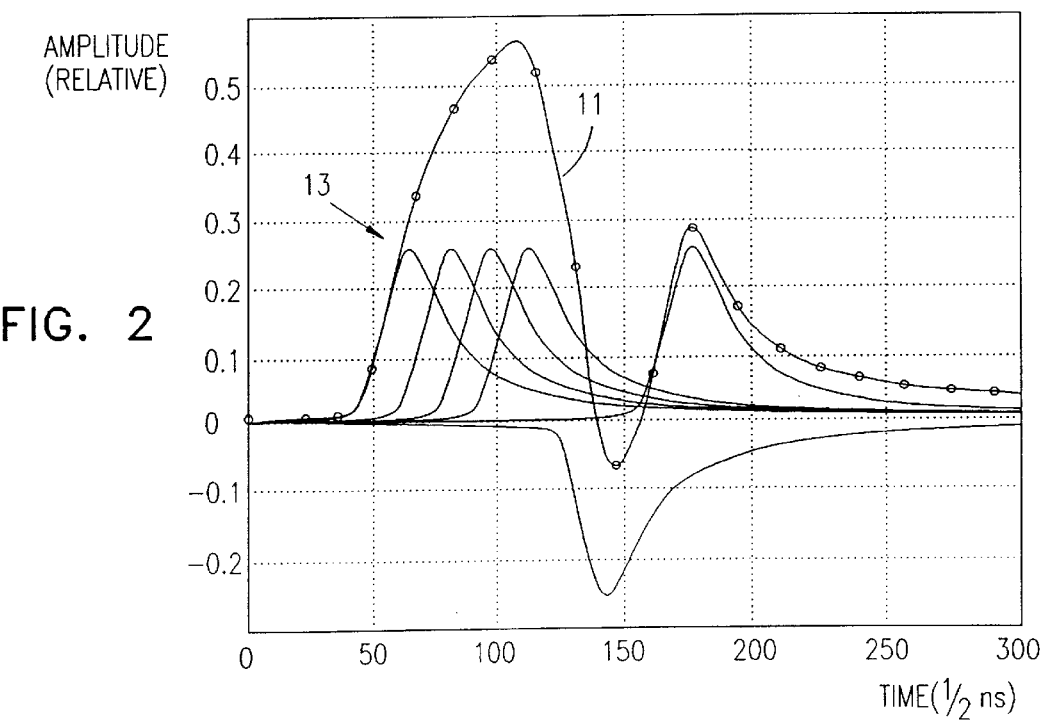
FIG. 2 is a graphical representation of a composite pulse signal conveyed over a cable of length 130 meters.
Figure 3:
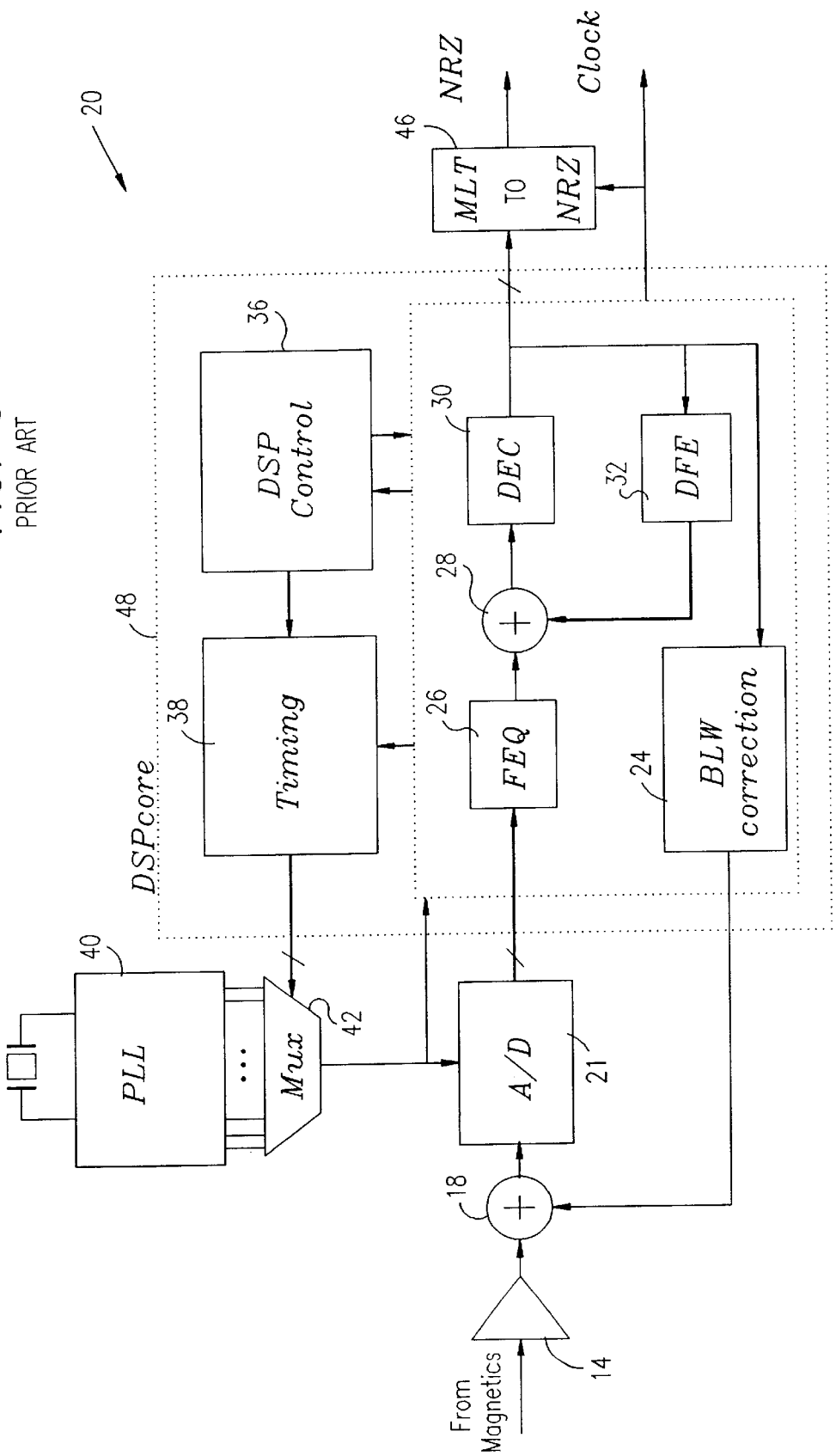
FIG. 3 is a block diagram of a receiver as is at present known in the art.

Signals from A/D converter 70 are sequentially transferred to a pre-decoding section 91, which takes the place of BLW correction 24 shown in FIG. 3 and typically used in receivers known in the art. Pre-decoding section 91 comprises a delay register 96 and an adder 98 with an inverting input. Most preferably delay register 96 operates at the incoming signal baud rate. Delay register 96 delays incoming signals by one clock period, so that a signal output from adder 98 is the result of subtracting each signal sample from an immediately preceding signal sample. Thus any "DC" level signal, such as a run of "1"s, or a run of "−1"s, will be output as a zero level from adder 98, substantially eliminating the baseline wander effect that is present in existing receivers.

Signals output from adder 98 are input to an equalization section 93. Section 93 comprises an equalization module 90, including forward equalization (FEQ) and decision feedback equalization (DFE) functions, and a decision module 88. Module 90 equalizes the signals received from adder 98, and also supplies an input to timing controller 84, as noted above. Module 90 furthermore acts as a whitening filter, thereby flattening the spectrum and so improving the convergence of the equalization. (In the book "Digital Communication," by Edward Lee and David Messerschmitt, Kluwer Academic Publishers, which is herein incorporated by reference, the authors describe the advantages of using whitening filters in adaptive equalizers.) The equalized signals are input to decision module 88, which determines whether or not there has been a transition in the MLT-3 signal (indicating a "1," as described hereinabove). An output from module 88 is input to module 90, for use in the decision feedback equalization. The structure and operation of module 90 and module 88 are described in greater detail hereinbelow. Signals from module 88 are decoded into a standard binary format, preferably non-return-to-zero (NRZ) format, in a NRZ module 104, and transmitted for further processing. Module-104, and respective input lines 102 and output lines therefrom, make up an output section 95.

Receiver 60 also comprises a digital signal processor module 86, which controls timing controller 84, decision module 88, module 90 and delay module 96, and supplies signals to A/D converter 70 to determine in which input voltage range the converter operates.

Figure 4B:
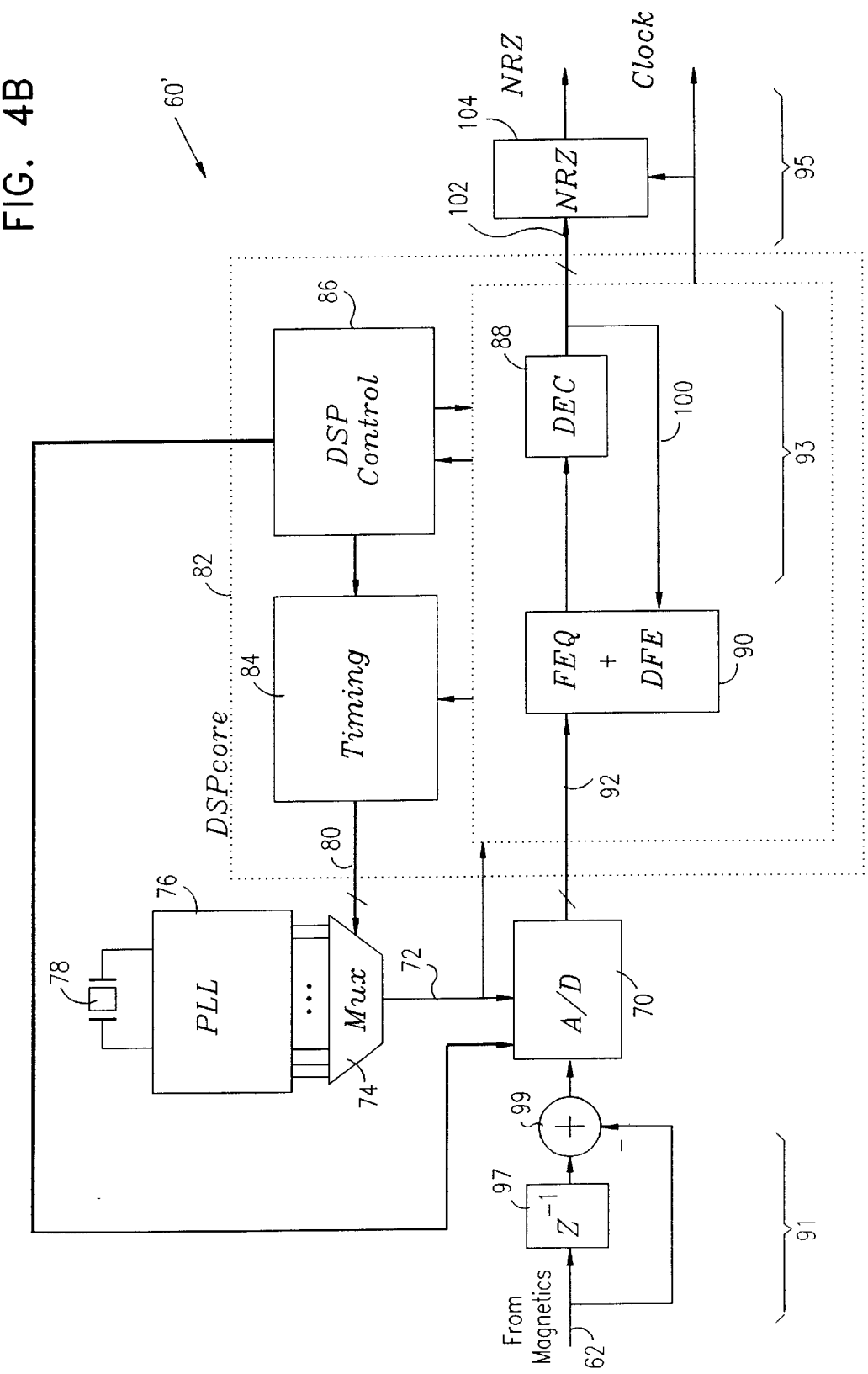
FIG. 4B is a block diagram of a receiver for MLT-3 signals in accordance with an alternative preferred embodiment of the present invention.

FIG. 4B is a block diagram of a receiver 60', in accordance with an alternative preferred embodiment of the present invention. Apart from the differences described hereinbelow, the operation of receiver 60' is generally similar to that of receiver 60 (FIG. 4A), whereby elements indicated by the same reference numerals in both receivers 60 and 60' are generally identical in construction and in operation. In receiver 60' the positions of pre-decoding section 91 and A/D converter 70 are reversed compared to their positions in receiver 60. Signals in MLT-3 format are received by an analog delay line 97 of pre-decoding section 91, which delays the signals by a single clock period, and are then subtracted from corresponding undelayed signals by a summer 99. A signal from summer 99 is input to A/D converter 70. (It will be appreciated that the dynamic range required of A/D converter 70 in receiver 60' is consequently less than the dynamic range of A/D converter in receiver 60, for similar signals.) Signals from A/D converter 70 are transferred to equalization section 93, which operates on the signals substantially as described hereinabove for receiver 60.

FIG. 5 is a block diagram of equalization module 90, in accordance with a preferred embodiment of the present invention. Module 90 comprises a forward equalization (FEQ) section 112, and a decision feedback equalization (DFE) section 114. Section 112 comprises a plurality of FEQ coefficient blocks 118, having adaptively variable coefficients "Coeff f1", "Coeff f2", . . . , through "Coeff f7"; a plurality of FEQ coefficient multipliers 120; a plurality of single clock delays 122; and a plurality of adders 124. It will be observed that section 112 operates as a forward equalizer for input signals "$X_i$" received from adder 98. Section 114 likewise comprises a plurality of DFE coefficient blocks 128, having adaptively variable coefficients "Coeff d1", "Coeff d2", . . . , through "Coeff d7"; a plurality of DFE coefficient multipliers 130; a plurality of single clock delays 132; and a plurality of adders 134. Section 114 thus operates as a decision feedback equalizer for signals "$Dec_i$" output by decision module 88. (The generation of the FEQ coefficients and of the DFE coefficients is described in detail hereinbelow.) The outputs of section 112 and section 114 are summed by an adder 136, and the result transferred to decision module 88.

FIG. 6 is a block diagram of a forward equalization and decision feedback module 90', in accordance with an alternative preferred embodiment of the present invention. This embodiment is functionally similar to the embodiment shown in FIG. 5, but reduces substantially the number of adders and delay register elements that need to be used. In FIG. 6, module 90' comprises coefficient blocks 118 and multipliers 120 in an FEQ section 158, and coefficient blocks 128 and multipliers 130 in a DFE section 160. Module 90' further comprises a plurality of adders 152, and a plurality of single clock delays 154, in the form of a single series pipeline. In distinction from the operation of module 90, outputs of corresponding multipliers 120 and 130 are added by their respective corresponding adder 152, and the result transferred via the respective corresponding clock delay 154 to the next adder 152 in the pipeline. The process continues for the plurality of adders 152, until the final equalized signal is output from a final adder 156 to decision module 88. Furthermore, the pipeline architecture of module 90' means that a very fast clock rate may be used in the module.

FIG. 7 is a block diagram of a forward equalization and decision feedback module 170, in accordance with an alternative preferred embodiment of the present invention. Module 170 substantially performs the functions ascribed hereinabove to module 90, as shown in FIG. 4A and FIG. 4B, using a combined pipeline architecture such as that shown in FIG. 6, but with relatively fewer FEQ stages. Module 170 comprises a forward equalization section 172, and a decision feedback equalization section 174. Section 172 comprises a most significant FEQ coefficient block 178 and a precursor FEQ coefficient block 179, respectively having adaptively variable coefficients "Coeff B1" and "Coeff B2", and further comprises a plurality of, preferably two, FEQ coefficient multipliers 180. Section 174 comprises a plurality, preferably 11, of DFE coefficient blocks 182, respectively having adaptively variable coefficients "Coeff d1" through "Coeff d11" (not all shown in FIG. 7), a most significant DFE coefficient block 183 having coefficient "Coeff d12", and a plurality of respective DFE coefficient multipliers 184. Module 170 also comprises a plurality of single clock delay blocks 186, a plurality of adders 188, and multiple-input adders 190, 192, and 194. A resultant equalized signal is output from adder 194.

In addition to equalizing the signals $X_j$, module 170 also provides timing information to timing controller 84 of FIG. 4A or FIG. 4B. The timing information is provided by generating a phase error signal from the difference between most significant DFE coefficient 183 and precursor FEQ coefficient 179. The operation of timing controller 84 is described in greater detail hereinbelow.

Figure 8:
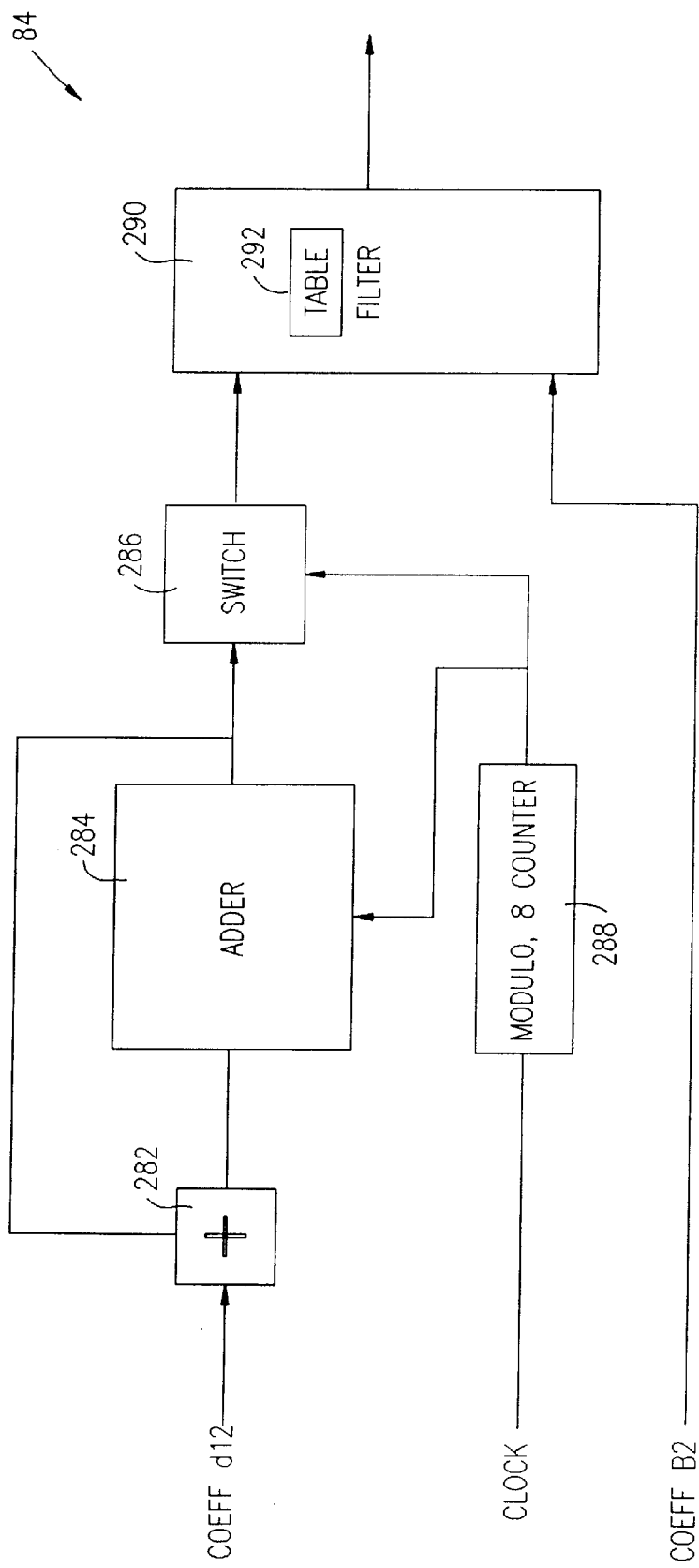
FIG. 8 is a block diagram of a timing controller, for use in the receiver of FIG. 4A or the receiver of FIG. 4B, in accordance with a preferred embodiment of the present invention.

FIG. 8 is a block diagram of timing controller 84 of FIG. 4A or FIG. 4B, in accordance with a preferred embodiment of the present invention. Signals corresponding to the most significant DFE coefficient "Coeff d12," from module 170, enter a first adder 282, whose output is transferred to a second adder 284. The signals from adder 284 are fed back to adder 282, so that adders 282 and 284 act together as an integrator. A counter 288 receives clock signals from DSP controller 86 (shown in FIG. 4A and FIG. 4B), and acts as a modulo 8 counter. After eight cycles counter 288 outputs to adder 284 to stop the integration, and to reset adder 284 to zero. The integrated "Coeff d12" output from adder 284 is fed forward via a closed switch 286 to a timing filter 290. Switch 286 is normally open, and is closed by a signal from counter 288.

Timing filter 290 also receives, from module 170, signals corresponding with the precursor FEQ coefficient "Coeff B2." Filter 290 calculates and stores a primary tri-level difference (1, 0, or −1) between precursor FEQ coefficient "Coeff B2" and the integrated "Coeff d12" output. Filter 290 then evaluates a secondary difference between the present tri-level difference and a previously stored tri-level difference. Using the values of the secondary difference and the present and previous primary differences, filter 290 outputs a clock phase change signal and a frequency offset signal to multiplexer 74 (shown in FIG. 4A and FIG. 4B). The phase change and the frequency offset are chosen so as to iteratively minimize the primary and secondary differences, according to the condition that at each iteration the phase change is zero or an increment or a decrement of $\frac{1}{16}$ of a clock cycle.

The phase change signal from filter 290 is generated according to a table 292 included within the filter, whose characteristics are shown hereinbelow, wherein a phase change of +1 corresponds to a signal to increment the phase of the clock signal by $\frac{1}{16}$ of a cycle, a phase change of −1 corresponds to a signal to decrement the phase of the clock signal by $\frac{1}{16}$ of a cycle, and a phase change of 0 corresponds to no change in the phase of the clock signal:

| Present Difference | Previous Difference | Phase Change |
|---|---|---|
| 0 | +1 | −1 |
| 0 | −1 | +1 |
| +1 | 0 | +1 |
| −1 | 0 | −1 |
| No combination above | | 0 |

The frequency offset signal from filter 290 is thus generated by iteratively solving an equation $df = df + k1 \cdot dp$, wherein df is a preliminary frequency offset, dp is the primary tri-level difference between precursor FEQ coefficient "Coeff B2" and the integrated "Coeff d12" output, and k1 is a predetermined constant.

Figure 9:
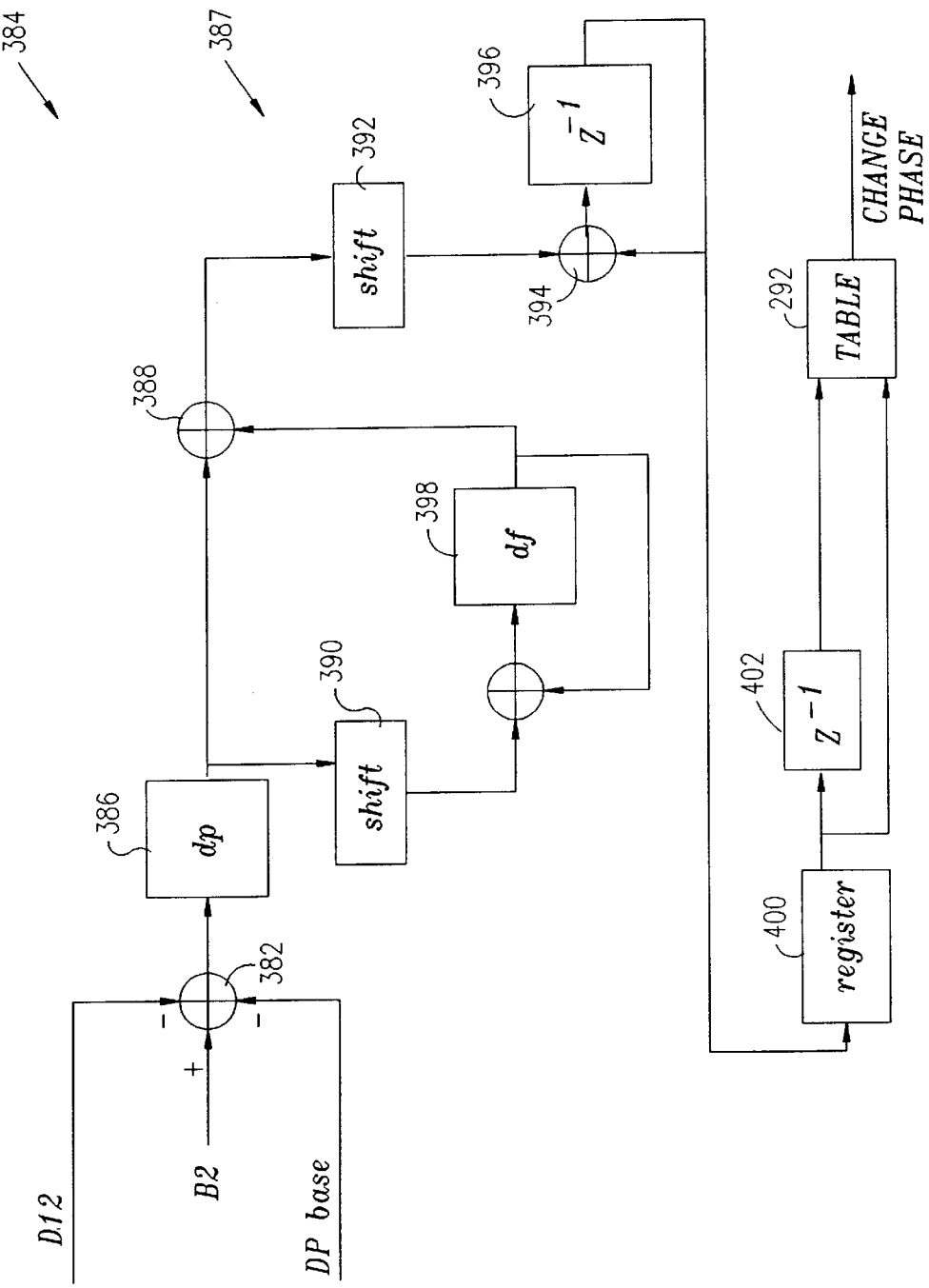
FIG. 9 is a block diagram of an alternative timing controller, for use in the receiver of FIG. 4A or the receiver of FIG. 4B, in accordance with a preferred embodiment of the present invention.

FIG. 9 is a block diagram of a timing controller 384, in accordance with a preferred embodiment of the present invention. Timing controller 384 may be used in place of timing controller 84, in receiver 60. Signals corresponding to the most significant DFE coefficient "Coeff d12" and to precursor FEQ coefficient "Coeff B2" from module 170, enter a first adder 382, which outputs a preliminary phase evaluation dp at block 386. dp is determined according to the equation: $dp = B2 - d12 - DPbase$, wherein DPbase is a constant offset value, preferably equal to 0.0625.

Signals from block 386 transfer to a second-order loop 387 (which performs the function of filter 290 in FIG. 8). Loop 387 includes an adder 388, which together with a shift-right block 390 and an initial frequency determining block 398, iteratively calculates a preliminary frequency offset df. The offset is calculated according to the equation: $df = df + k1 \cdot dp$, wherein k1 is a coefficient that is determined according to the shift applied by block 390. Preferably, block 390 shifts right by 13 places.

Adder 388 accumulatively adds the value of df and the value of dp, to generate a frequency offset signal, which is further transferred, via a shift-right block 392, to an adder 394 and a phase integrator block 396. Preferably, block 392 shifts right by 7 places. The result of the integration is output to a difference storage register 400. The current and previous values from register 400 (wherein the previous value is generated using a delay register 402) are input to a table 292, whose characteristics are substantially similar to those described hereinabove for timing controller 84. The output from the table determines the phase change signal output from timing controller 384 to multiplexer 74 (FIGS. 4A and 4B).

The use of one FEQ coefficient and one DFE coefficient in a system substantially as described hereinabove for controller 84 or controller 384, in order to correct both the frequency and the phase of the clock signal, leads to substantially better recovery and stability of the clock signal compared to systems at present known in the art.

Figure 10:
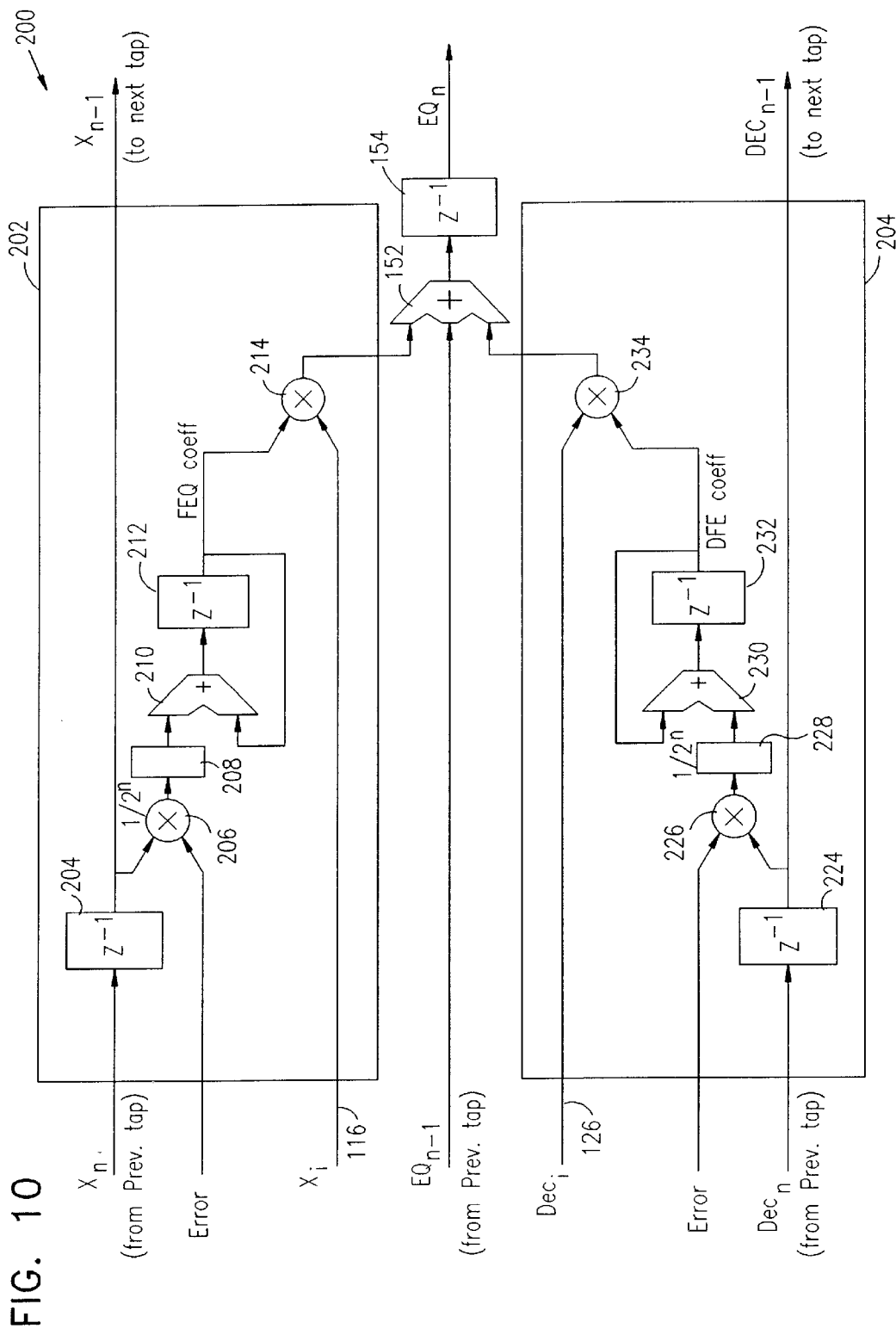
FIG. 10 is a block diagram of a section of the equalizers of FIG. 6, showing the generation of coefficients and the operation of one tap of the equalizers, in accordance with a preferred embodiment of the present invention.

FIG. 10 is a block diagram showing a detail of module 90' of FIG. 6, in accordance with a preferred embodiment of the present invention, showing the internal operation of a section 200 of the module and the generation of FEQ coefficients and DFE coefficients therein. Module 90' may be considered to be constructed as a plurality of sections substantially similar to section 200, connected sequentially. Section 200 corresponds to a third tap 201 of section 158 and to a third tap 203 of section 160 of FIG. 6. A subsection 202 of section 200 receives a signal $X_n$ from a previous tap, which enters a single clock delay block 204. The signal is then transferred to a next tap along section 158 and is also input to a multiplier 206, wherein it is multiplied by an error signal derived from decision module 88 of FIG. 4. The generation of the error signal is described hereinbelow.

Multiplier 206 transfers its output to a shifter 208, which divides the output of the multiplier by a predetermined power of 2 and outputs the result to a first input of an adder 210. Adder 210 outputs its result to a single clock delay block 212, which outputs the respective FEQ coefficient. The FEQ coefficient is fed back to a second input of adder 210, which thus acts as a integrator, and is fed forward to a multiplier 214, to which signal $X_i$ is also input. The multiplicand of multiplier 214 is transferred to a first input of adder 152. It will thus be understood that as long as the error signal input to multiplier 206 is non-zero, the FEQ coefficient will gradually change, so as to improve the equalization of the signal. When the error signal is zero, the FEQ coefficient will stabilize at a substantially optimal value.

Section 204 operates on signals Decn in substantially the same way as described hereinabove for section 202, outputting its result to a second input of adder 152. It will be appreciated that in section 204 signals $Dec_n$ have values 1, 0, or –1, so that multiplier 226 simply acts as a selector for its incoming error signal, outputting either the error signal itself, or its complement, or zero.

Adder 152 receives a third equalized input $Eq_{n-1}$ from a previous tap 205, and the output of adder 152 is transferred to single clock delay 154. The output of single clock delay 154 is an equalized output $Eq_n$ of section 200, and output $Eq_n$ is transferred forward to a following section, or alternatively, as the final equalized signal of module 90'. While the description hereinabove for the operation of section 200 applies specifically to module 90', it will be appreciated that the operation of a section 209 of module 170 (shown in FIG. 7) will be substantially the same as the operation of section 200.

Figure 11:
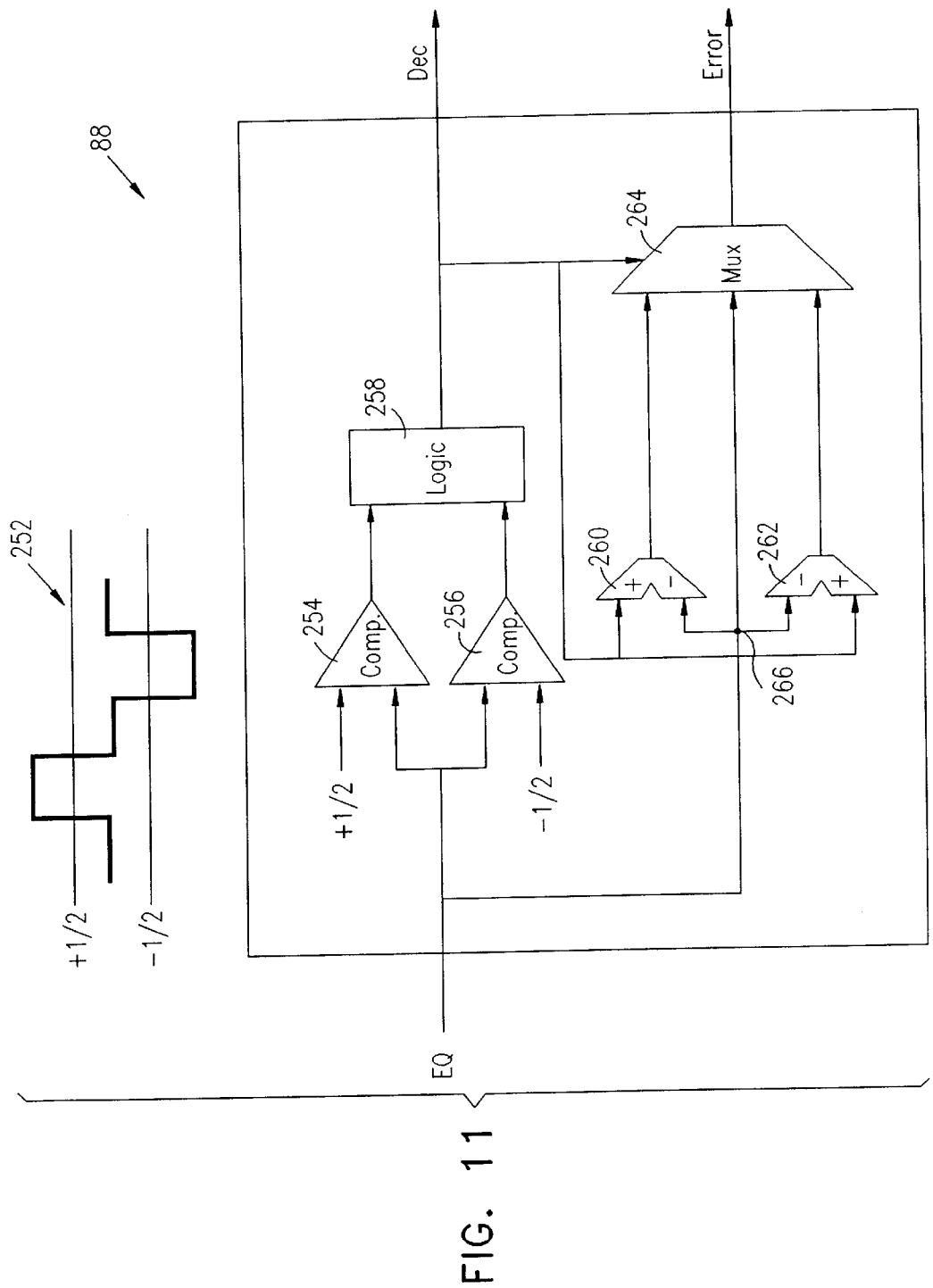
FIG. 11 is a block diagram of a decision module, for use in the receiver of FIG. 4A or the receiver of FIG. 4B, in accordance with a preferred embodiment of the present invention.

FIG. 11 is a block diagram of decision module 88 of FIG. 4A or FIG. 4B, in accordance with a preferred embodiment of the present invention. Decision module 88 decides which of three levels, 1, 0, or –1, an incoming equalized signal represents, by comparing the incoming signal to a first reference level of +½, and to a second reference level of –½. Module 88 furthermore generates the error signal that is input, as described hereinabove, to multiplier 206 and selector 226 of section 200, and which is substantially dependent on the difference between the incoming equalized signal and an output signal "Dec".

Equalized signals from FEQ/DFE block 90 are input to comparators 254 and 256, and are also input to a junction 266. Comparator 254 compares the signal to the reference +½ level, and comparator 256 compares the signal to the reference –½ level. The comparison is exemplified by a schematically illustrated signal 252. The outputs of the respective comparators are output to a logic module 258, which determines the level, 1, 0, or –1, to which to set the output MLT-3 "Dec" signal, based on the comparison. NRZ block 104 (FIG. 4) converts this signal to a suitable binary signal for input to subsequent processing stages, as are known in the art. Alternatively, logic 258 may itself output an NRZ signal, so that an additional NRZ block is not needed.

Returning to FIG. 11, the output "Dec" signal is also input to adders 260 and 262, and as a control signal to a multiplexer 264. Adders 260 and 262 subtract the incoming equalized signals via junction 266 from the "Dec" signal. Multiplexer 264 selects among the outputs of adders 260 and 262 and the incoming equalized signal, depending upon the "Dec" output of logic 258, and outputs an "Error" signal dependent on the difference between the input equalized signal and the control "Dec" signal. The Error signal will be driven to zero when the equalized signal input levels stabilize at the appropriate 1, 0 and –1 levels.

It will be appreciated that other arrangements of the modules described hereinabove may also be used advantageously in other receivers. All such arrangements, and their use in receiving digital signals, are considered to be within the scope of the present invention. The principles of the present invention thus enable receivers to receive data with superior accuracy and reduced symbol error, compared to receivers at present known in the art.

It will be further appreciated that the preferred embodiments described above are cited by way of example, and the full scope of the invention is limited only by the claims.

What is claimed is:

1. A receiver, comprising:
    a magnetics stage, which receives baseband signals, generated in an ordered level change (OLC) format, from a communications line representative of data input to the line and which generates from the baseband signals transformed signals characterized by baseline wander;
    a pre-decoding section, which receives and samples the signals and subtracts each sample from a preceding sample so as to generate modified data in which the baseline wander is substantially eliminated; and
    an equalization section, which receives the modified data and generates equalized output data representative of the data input to the communications line.

2. A receiver according to claim 1, and comprising an analog-to-digital (A/D) converter which digitizes the transformed signals and transmits the digitized transformed signals to the pre-decoding section.

3. A receiver according to claim 1, and comprising an A/D converter which digitizes the modified data and transmits the digitized modified data to the equalization section.

4. A receiver according to claim 1, wherein the equalization section comprises a pipeline, including one or more delay stages and one or more respective adders, and wherein the pre-decoding section comprises an input to the pipeline.

5. A receiver according to claim 1, wherein the equalization section comprises a decision module which compares the equalized output data to one or more predetermined thresholds and responsive thereto outputs decision data corresponding to a level of the input data.

6. A receiver according to claim 5, wherein the decision module outputs an error signal, indicative of a deviation of the equalized output data relative to the level of the input data, which error signal is fed back a to an input of the equalization section.

7. A receiver according to claim 6, wherein the equalization section generates, responsive to the error signal, one or more forward equalization coefficients, which multiply the modified data, and one or more decision feedback equalization coefficients, which multiply the decision data, and wherein the multiplied modified data and decision data are summed to generate the equalized output data.

8. A receiver according to claim 7, and comprising a clock generator, which provides a timing signal to control sampling of an A/D converter which digitizes the signals, wherein the generator adjusts the timing signal responsive to one or more of the coefficients.

9. A receiver, comprising:
a pre-decoding section, which is coupled to receive baseband signals generated in an ordered level change (OLC) format from a communications line, the signals comprising −1, 0, and 1 OLC levels and being formed responsive to originating binary data, and which is adapted to sample the baseband signals and to subtract each sample from a preceding sample so as to generate modified data representative of the originating data, such that a DC level in the received baseband signals yields a zero level in the modified data;
an equalization section, which receives the modified data and generates equalized output data; and
a decision logic section which receives and translates the equalized output data to recover the originating binary data by decoding the zero level in the modified data as a binary zero, and decoding other levels in the modified data as a binary one.

10. A receiver according to claim 9, wherein the ordered level change format comprises an MLT-3 format.

11. A receiver, comprising:
an analog-to-digital (A/D) converter, which receives baseband signals from a communications line and samples the signals at a rate approximately equal to a symbol rate of the signals so as to generate digitized data;
an equalization section which receives the digitized data and which generates equalized output data, representative of data input to the communications line, and which also generates, responsive to an error signal indicative of a deviation of the equalized output data relative to the data input to the line, one or more forward equalization (FEQ) coefficients, and which further generates, responsive to a decision signal indicative of a level of the data input to the communications line, one or more decision feedback equalization (DFE) coefficients, which FEQ and DFE coefficients are used in generating the equalized output data, and which provides at least one of the FEQ coefficients and at least one of the DFB coefficients for use in determining a variable clock signal;
a decision module, which compares the equalized output data to one or more predetermined thresholds and responsive thereto outputs the decision signal; and
a clock generator which receives the at least one of the FEQ coefficients and the at least one of the DEE coefficients from the equalization section and which generates the variable clock signal responsive thereto, which clock signal is used to time the sampling of the A/D converter.

12. A receiver according to claim 11, wherein a phase of the clock generator is varied responsive to the decision signal.

13. A receiver according to claim 12, wherein the clock generator provides a plurality of clock signals having different, respective phases, such that the phase of the clock generator is varied by selecting one of the plurality of signals responsive to the decision signal.

14. A receiver according to claim 11, wherein a frequency of the clock generator is varied responsive to the decision signal.

15. A receiver according to claim 11, wherein the equalization section comprises a processing pipeline which generates the one or more REQ coefficients and the one or more DFE coefficients which multiply the decision signal.

16. A receiver according to claim 11, wherein the clock generator generates the clock signal responsive to a precursor coefficient of the one or more REQ coefficients and a most significant one of the one or more DFE coefficients.

17. A receiver according to claim 11, wherein the clock generator generates the clock signal responsive to an integration of at least one of the FEQ and DFE coefficients over a predetermined number of clock cycles.

18. A receiver according to claim 17, wherein the clock signal is varied responsive to a primary difference between the integration and the at least one of the coefficients.

19. A receiver according to claim 18, wherein the clock signal is varied responsive to a secondary difference corresponding to a variation over time in the primary difference.

20. A receiver according to claim 11, wherein the clock generator generates the clock signal responsive to a difference between one of the FEQ coefficients and one of the DFE coefficients.

21. A receiver according to claim 20, wherein the clock generator generates a frequency offset of the clock signal responsive to an integration over a predetermined number of clock cycles of the difference between the one of the FEQ coefficients and the one of the DEE coefficients.

22. A receiver according to claim 20, wherein the clock generator generates a phase change of the clock signal responsive to at least one integration of the difference between the one of the FEQ coefficients and the one of the DFE coefficients.

23. A method for processing signals, comprising:
receiving baseband signals, generated in an ordered level change (OLC) format, from a communications line representative of data input to the line in a magnetics stage;
generating from the baseband signals in the magnetics stage transformed signals characterized by baseline wander;
receiving and sampling the transformed signals in a pre-decoding section;
subtracting each sample from a preceding sample so as to generate modified data in which the baseline wander is substantially eliminated; and
receiving the modified data in an equalization section and generating therefrom equalized output data representative of the data input to the communications line.

24. A method according to claim 23, and comprising digitizing the transformed signals in an analog-to-digital (A/D) converter and transmitting the digitized transformed signals to the pre-decoding section.

25. A method according to claim 23, and comprising digitizing the modified data in an A7D converter and transmitting the digitized modified data to the equalization section.

26. A method according to claim 23, wherein generating equalized output data comprises passing the modified data through a pipeline, including one or more delay stages and one or more respective adders, and wherein subtracting each sample comprises inverting each sample and inputting the inverted sample to the pipeline.

27. A method according to claim 23, and comprising:

comparing the equalized output data to one or more predetermined thresholds in a decision module comprised in the equalization section; and outputting decision data corresponding to a level of the input data responsive to the comparison.

28. A method according to 27, wherein comparing the equalized output data comprises outputting an error signal indicative of a deviation of the equalized output data relative to the level of the input data and processing the output data responsive to the error signal.

29. A method according to claim 28, wherein receiving the modified data comprises generating, responsive to the error signal, one or more forward equalization coefficients which multiply the modified data, and one or more decision feedback equalization coefficients which multiply the decision data, and summing the multiplied corrected data and decision data.

30. A method according to claim 29, and comprising generating a timing signal to control sampling of an A D converter which digitizes the signals, and adjusting the timing signal responsive to one or more of the coefficients.

31. A method for receiving baseband signals, comprising:

receiving the baseband signals from a communications line, the signals being generated in an ordered level change (OLC) format and comprising −1, 0, and 1 OLC levels and being formed responsive to originating binary data;

sampling the baseband signals;

subtracting each sample from a preceding sample so as to generate modified data representative of the originating data, such that a DC level in the received baseband signals yields a zero level in the modified data;

receiving the modified data and generating equalized output data free of baseline wander; and receiving and translating the equalized output data to recover the originating binary data by decoding the zero level in the modified data as a binary zero, and decoding other levels in the modified data as a binary one.

32. A method according to claim 31, wherein the ordered level change format comprises an MLT-3 format.

33. A method for receiving baseband signals, comprising:

receiving the baseband signals from a communications line in an analog-to-digital (A/D) converter;

sampling the signals in the A/D converter at a rate approximately equal to a symbol rate of the signals so as to generate digitized data;

receiving the digitized data in an equalization section and generating therein equalized output data representative of data input to the communications line;

generating one or more forward equalization (FEQ) coefficients, responsive to an error signal indicative of a deviation of the equalized output data relative to the data input to the line in an equalization section;

generating one or more decision feedback equalization (DFE) coefficients, responsive to a decision signal indicative of a level of the data input to the communications line in the equalization section;

providing from the equalization section at least one of the FEQ coefficients and at least one of the DFE coefficients for use in determining a variable clock signal;

comparing in a decision module the equalized output data to one or more predetermined thresholds and responsive thereto outputting the decision signal;

receiving in a clock generator the at least one of the FEQ coefficients and the at least one of the DFE coefficients;

generating a variable clock signal in the clock generator responsive to the at least one of the FEQ coefficients and the at least one of the DFE coefficients; and timing the sampling of the A/D converter with the clock signal.

34. A method according to claim 33, wherein generating the variable clock signal comprises varying a phase of the clock generator responsive to the decision signal.

35. A method according to claim 34, wherein varying the phase comprises providing a plurality of clock signals having different, respective phases, and selecting one of the plurality of signals responsive to the decision signal.

36. A method according to claim 33, wherein generating the variable clock signal comprises varying a frequency of the clock generator responsive to the decision signal.

37. A method according to claim 33, wherein the equalization section comprises a processing pipeline which generates the one or more FEQ coefficients and the one or more DEE coefficients which multiply the decision.

38. A method according to claim 33, wherein generating the variable clock signal comprises generating a signal responsive to a precursor coefficient of the one or more FEQ coefficients and to a most significant one of the one or more DFE coefficients.

39. A method according to claim 33, wherein generating the variable clock signal comprises integrating at least one of the FEQ and DFE coefficients over a predetermined number of clock cycles to generate an integrated output and varying the clock signal responsive to the integrated output.

40. A method according to claim 39, wherein varying the clock signal comprises determining a primary difference between the integrated output and the at least one of the coefficients and varying the clock signal responsive to the primary difference.

41. A method according to claim 40, wherein varying the clock signal comprises determining a secondary difference corresponding to a variation over time in the primary difference and varying the clock signal responsive to the secondary difference.

42. A method according to claim 33, wherein generating the variable clock signal comprises generating the clock signal responsive to a difference between one of the FEQ coefficients and one of the DFE coefficients.

43. A method according to claim 42, wherein generating the clock signal comprises generating a frequency offset of the clock signal responsive to an integration over a predetermined number of clock cycles of the difference between the one of the FEQ coefficients and the one of the DFE coefficients.

44. A method according to claim 42, wherein generating the clock signal comprises generating a phase change of the clock signal responsive to at least one integration of the difference between the one of the FEQ coefficients and the one of the DFE coefficients.

* * * * *